United States Patent [19]
LaRiviere

[11] Patent Number: 5,813,685
[45] Date of Patent: Sep. 29, 1998

[54] SPRINGER FORK LOW RIDER ASSEMBLY FOR A BICYCLE

[76] Inventor: Alexander LaRiviere, 702 S. First St., San Jose, Calif. 95113

[21] Appl. No.: 45,747

[22] Filed: Apr. 8, 1993

Related U.S. Application Data

[63] Continuation-in-part of Ser. No. 11,610, Feb. 1, 1993, abandoned.

[51] Int. Cl.$^6$ .................................................. B62K 21/02
[52] U.S. Cl. ......................................... 280/279; 280/276
[58] Field of Search ................................... 280/276, 279, 280/283, 288.1, 281.1, 286, 275

[56] References Cited

U.S. PATENT DOCUMENTS

| | | | |
|---|---|---|---|
| 1,387,215 | 8/1921 | Wagner | 280/279 |
| 1,500,480 | 7/1924 | Zichman | 280/276 |
| 1,995,796 | 3/1935 | Clark | 280/286 |
| 2,160,034 | 5/1939 | Schwinn | 280/276 |
| 2,298,494 | 10/1942 | Manton | 280/276 |
| 2,513,496 | 7/1950 | Kranz | 280/276 X |
| 2,550,876 | 5/1951 | Spencer | 280/276 |
| 2,590,050 | 3/1952 | Smith | 280/276 |
| 3,208,767 | 9/1965 | Moulton | 280/276 |
| 3,643,974 | 2/1972 | Peate | 280/279 X |
| 3,770,295 | 11/1973 | Sword | 280/279 X |
| 4,037,855 | 7/1977 | Smith | 280/276 |
| 4,162,797 | 7/1979 | McBride | 280/275 |
| 4,480,848 | 11/1984 | Geogiev | 280/288.1 |
| 4,565,383 | 1/1986 | Isaac | 280/276 |
| 5,165,712 | 11/1992 | Fuller | 280/276 X |

FOREIGN PATENT DOCUMENTS

| | | | |
|---|---|---|---|
| 671164 | 2/1939 | Germany | 280/279 |

*Primary Examiner*—Brian L. Johnson
*Attorney, Agent, or Firm*—LaRiviere, Grubman & Payne

[57] ABSTRACT

A 26-inch springer fork is bent to produce a forward curve in the furcations or arms of the fork. The curve has a bending radius of substantially six inches, and the angle between the arms and the main body of the fork is less than a right angle. Typically, the angle of bend is on the order of substantially seventy-five degrees. When mounted on a bicycle, the curved fork causes the front wheel to extend forward in front of the bicycle, and gives the bicycle a longer, lower look, thereby emulating what is known as a "low rider." The struts of the springer fork are shortened to accommodate the bend. The springer fork has a steer tube provided with a threaded member at the bottom thereof for mounting a fender. An angulated washer is provided for matching a mounting screw to the inner curved surface of the fender.

12 Claims, 8 Drawing Sheets

SPRINGER FORK LOW RIDER ASSEMBLY FOR A BICYCLE

RELATED APPLICATIONS

This is a continuation-in-part of application Ser. No. 08/011,610, filed Feb. 1, 1993 by the same inventor of the present application with the title of Low Rider Kit For A Bicycle and now abandoned.

BACKGROUND OF THE INVENTION

The present invention relates to bicycles and, more particularly, to a kit for safely converting a standard bicycle to a customized low rider style bicycle.

It is present practice to modify standard bicycles to a stylistic form referred to as "low riders". Shows are held to display these customized bicycles, and competitions are held to judge them and award trophies and prizes. News of such events and pictures of the bicycles are published in magazines such as Orlie's Lowriding Magazine, P.O. Box 44338 Rio Rancho, Rio Rancho, N. Mex. 87174; and in Low Rider Magazine, Park Avenue Publishing, Inc., P.O. Box 648, Walnut, Calif. 91788. These magazines represent the known published prior art in this field.

Over the past several years, the demand for low riders has increased substantially. The consumers range from young children to adults, and are not limited to one economic or ethnic group. Making a low rider involves giving the bicycle a longer and lower look. A low rider bicycle may comprise some or all of the following components: a cantilever frame, a specially bent fork, chrome mirrors, white-wall tires, chrome pedals, chrome chain, chrome chainguard, chrome fenders, high-rise handlebars, chrome "sissy-bar", chrome wheels, and banana seats. In addition, there could be other modifications such as using a smaller wheel on the front or on the rear, gold plating various parts, molding surfaces using a plastic material such as that known as "BONDO," or the like, painting the tank section, using painted hubcaps, and using special paints and upholstery.

Of all the foregoing components that may be employed in making a low rider bicycle, the key component is the fork. It is the fork that principally contributes the longer and lower look that defines a low rider. Heretofore, there has been no low rider fork on the market, so those who desire to build a low rider are forced to make their own low rider fork. These customizers are buying standard forks, or using the original forks and bending them. This usually causes fatigue of the fork, eventually causing it to collapse. At the minimum, fatigue of the fork can cause the pedals to drag on the ground.

Frequently, the bicycles are modified by inexperienced persons who do not understand safety principles, or who are willing to take chances. The low rider bicycles are made not only for show, but also to be ridden. If the modifications are incorrectly done, the pedals of a low rider bicycle may hit the street when the bicycle is being ridden, causing the bicycle to overturn. In this way, a serious accident may result, and the bicycle rider may be seriously injured. This type of hazard is caused by modifying the structure of the bicycle in such a way as to provide a low ground clearance between the bottom bracket and the street.

Another hazard is damaging the structural integrity of the bicycle. Sometimes inexperienced persons will bend the front fork using heat which softens the fork and leads to collapse when the bicycle is being ridden. At other times, the fork will be bent in such a way as to produce a kink at the bend. These kinks can also lead to collapse, thereby causing an accident.

This is a problem that actually exists. Investigations of bicycle accidents in connection with litigation have shown that incorrect modification of stock bicycle forks can be irresponsible and dangerous. Youngsters that ride incorrectly modified bicycles are literally taking their life in their hands. Accordingly, there is a need for a low rider kit for a bicycle that makes the low rider safe and rideable.

One very popular type of fork for low riders is known as a "springer fork". The springer fork was originally made by Schwinn, but is now a discontinued item. However, other manufacturers are presently manufacturing a replica of the Schwinn springer fork. To convert the springer fork to a low rider fork, the common practice is to bend the fork by heating it with a torch, and then send it out to be plated. The result is an unsafe fork that may collapse, a bicycle frame that is lowered to the point that the pedals may hit the ground, and a high price when the cost of bending and plating is included.

DISCLOSURE OF INVENTION

In accordance with the present invention, there is provided a modification kit that includes a special front fork for modifying a stock bicycle into a low rider. The features of this front fork are that it is safe, it does not damage the structural integrity of the bicycle, and it does not damage the steerability of the bicycle. The fork of the present invention gives the low rider look while eliminating the need to use heat for bending, eliminating the need for a separate safety washer for the safety dropout, and it is made of stronger materials, eliminating the need for a reinforcing strut to support the forward curvature of the fork. In addition, the fork of the present invention is inexpensive in contrast with other customizing forks; it projects the front wheel out in front of the bicycle; and it is already chrome plated. The fork of the present invention gives the illusion of a low rider, but the bicycle frame is not actually lowered to bring it closer to the street. The present invention also comprehends the method of making the low rider fork used in the modification kit.

The low rider fork is made from a straight chrome-plated standard long fork for a standard bicycle. Then, the straight fork is bent toward the front in a smooth curve to extend the front wheel out in front of the bicycle. After bending, the long fork is the equivalent of a twenty inch fork. Twenty inch wheels are used on both the front and the rear. The fork is bent into a smooth curve having about a six inch bending radius that stops short of being a ninety degree bend. The bend is on the order of 75 degrees, and may fall in the range of about 70 degrees to about 80 degrees.

In accordance with the present invention, the low rider springer fork is made by bending a 26 inch fork to make a 20 inch curved fork. The bending is done cold, that is, without heating the fork and without damaging the chrome plating. The fork is bent into a smooth curve having about a six inch bending radius. The bend is slightly less than a ninety degree bend, and is in the range of about 70 degrees to about 80 degrees.

Struts that are normally a part of the springer fork are shortened to accommodate the change from a 26 inch fork to a 20 inch curved fork. This bend gives the appearance of a low rider without bringing the pedals closer to the ground. No re-chroming is necessary, and there is no buckling of metal.

The low rider springer fork is used with a standard 20 inch wheel and a standard 20 inch fender. A threaded fastener is affixed to the bottom of the steer tube for fastening the fender. A long screw may be passed through a hole in the fender and into the threaded fastener in the bottom of the steer tube. An angulated washer may be used to accommodate the curvature of the fender to the head of the screw. A two inch section of hollow chrome tubing may be used to hide the screw threads.

BRIEF DESCRIPTION OF THE DRAWINGS

In the detailed description of the preferred embodiments of the invention hereinafter presented, reference is made to the accompanying drawings, in which.

Figure 1:
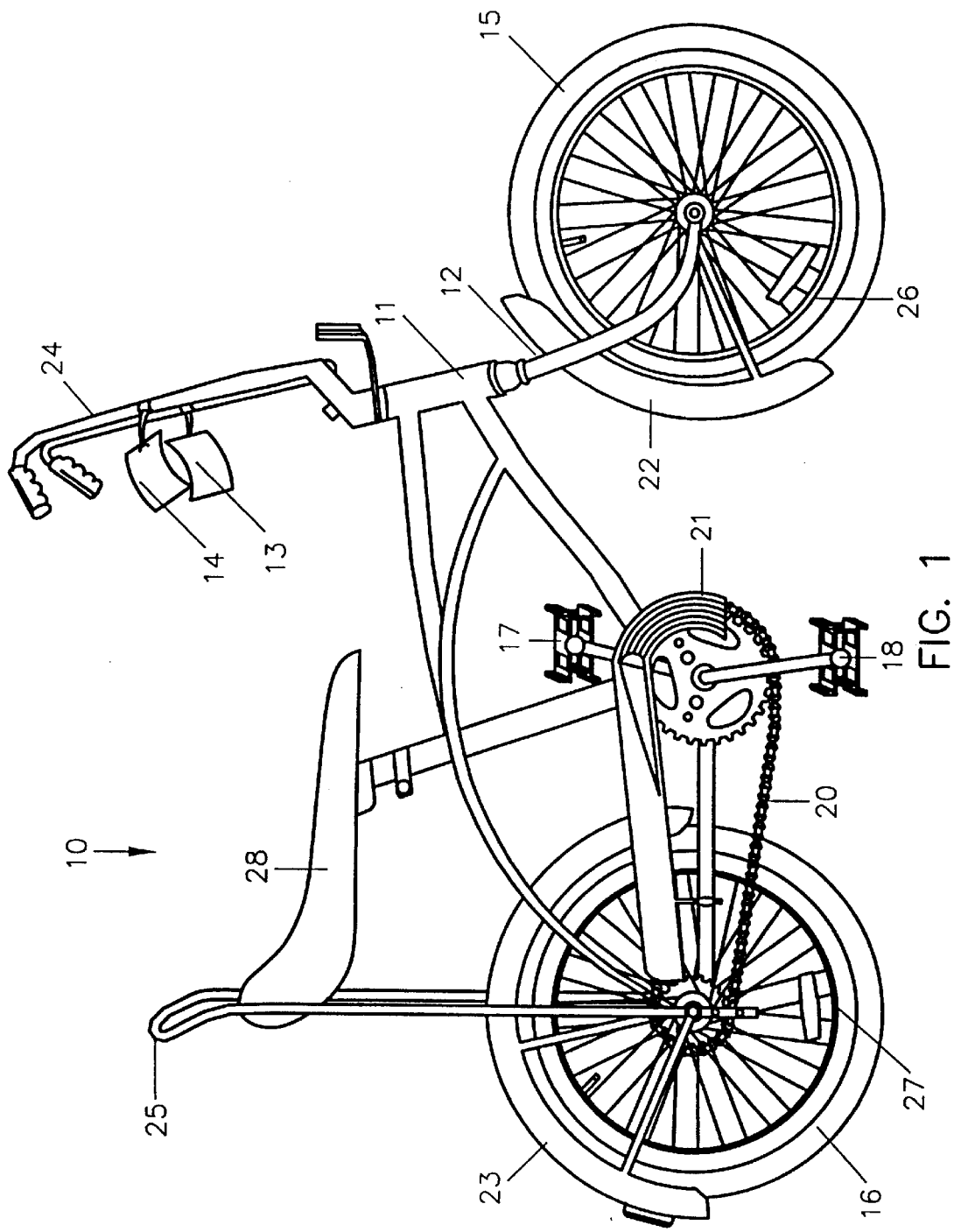
FIG. 1 is a side elevation view of a bicycle incorporating the low rider kit of the present invention.

Reference numbers refer to the same or equivalent parts of the invention throughout the several figures of the drawing.

DESCRIPTION OF THE PREFERRED EMBODIMENTS

Figure 2:
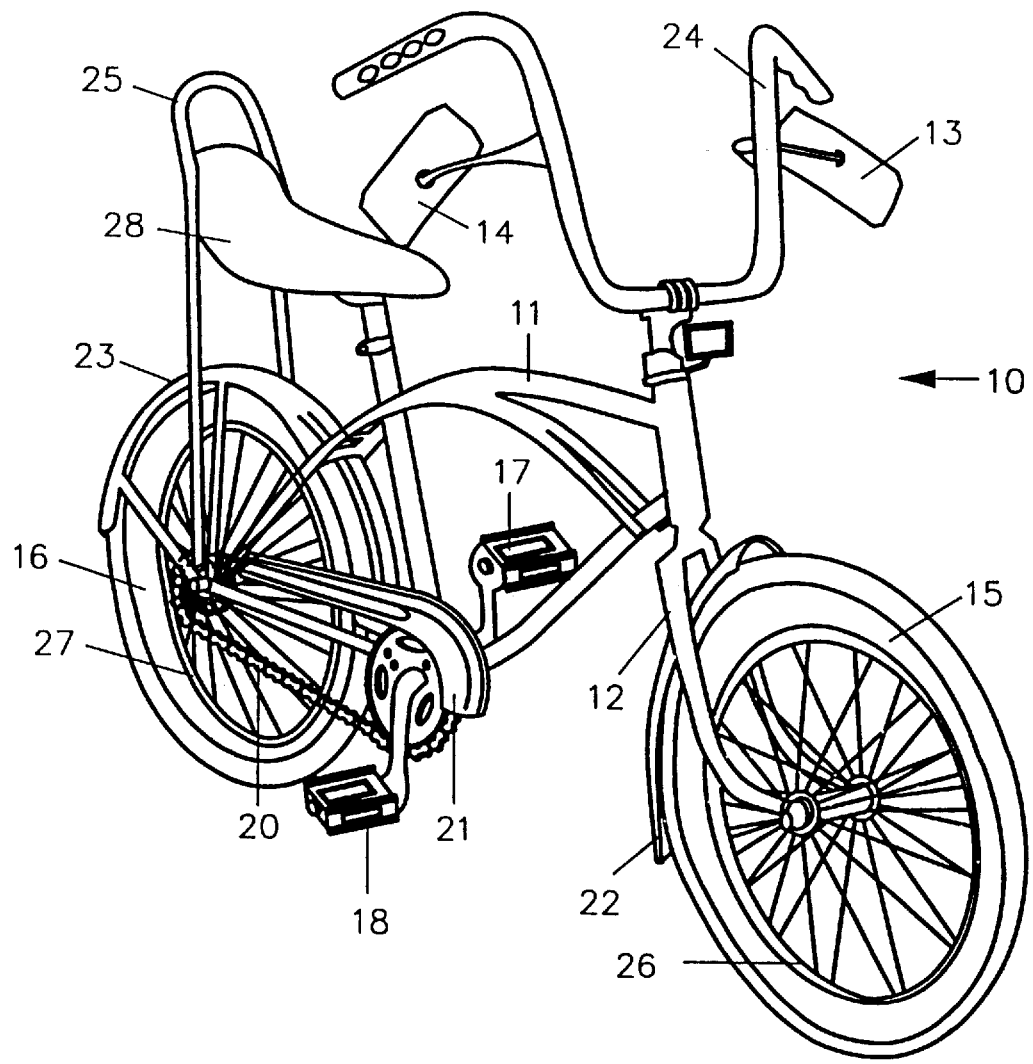
FIG. 2 is a perspective view of the bicycle shown in FIG. 1.

Referring now to FIGS. 1 and 2 of the drawings, there is shown a bicycle 10 incorporating a low rider kit in accordance with the present invention. FIG. 1 is a side view of the bicycle 10, while FIG. 2 is a perspective view. The bicycle 10 includes a cantilever frame 11, a specially bent fork 12, left and right chrome mirrors 13, 14, front and rear whitewall tires 15, 16, left and right chrome pedals 17, 18, a chrome chain 20, a chrome chainguard 21, front and rear chrome fenders 22, 23, high-rise handlebars 24, a chrome "sissy bar" 25, front and rear chrome wheels 26, 27, and a banana seat 28.

Figure 3:
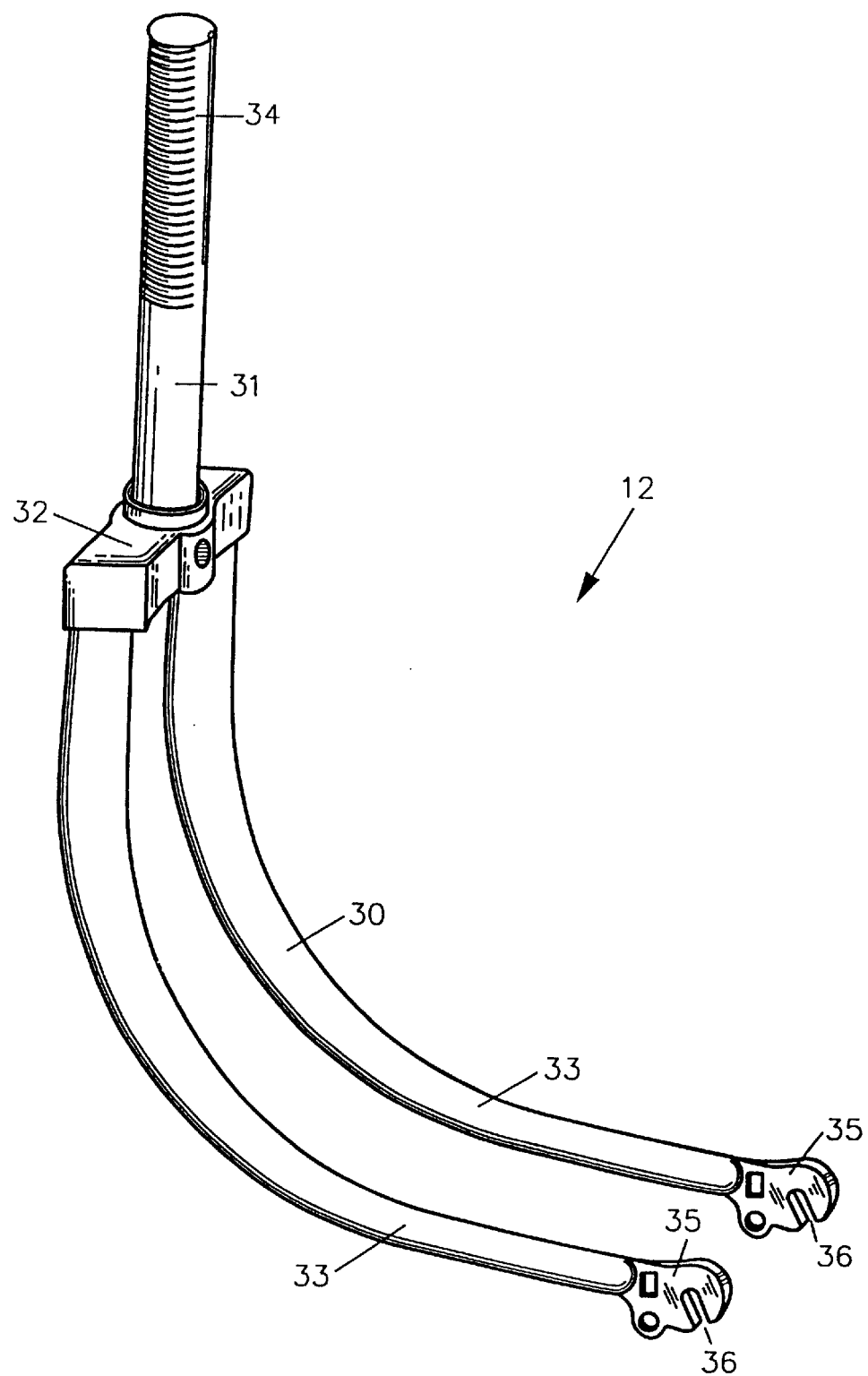
FIG. 3 is a perspective view of a low rider fork made in accordance with the principles of the present invention.

Referring now to FIG. 3, there is shown a perspective view of the bicycle fork 12. The fork 12 is made of chrome plated steel, and comprises a steer tube 31, a crown 32, and two arms or furcations 33. The steer tube 31 is approximately eight inches long and one inch in diameter, and is provided with external threads 34 along the upper half thereof. The steer tube 31, crown 32, and furcations 33 are joined together into an integral structure, as by welding. The furcations 33, are approximately sixteen inches long, of a generally tubular shape having a tapering thickness toward the distal end. The furcations 33 are provided with flattened fastening members or ears 35 at the distal end, and are provided with openings or slots 36 therein for fastening to the axle of the front wheel 26 (FIG. 1). The furcations 23 are not absolutely straight prior to bending, but the lower limb of the fork 12 has a slight rake near the distal end.

Figure 4:
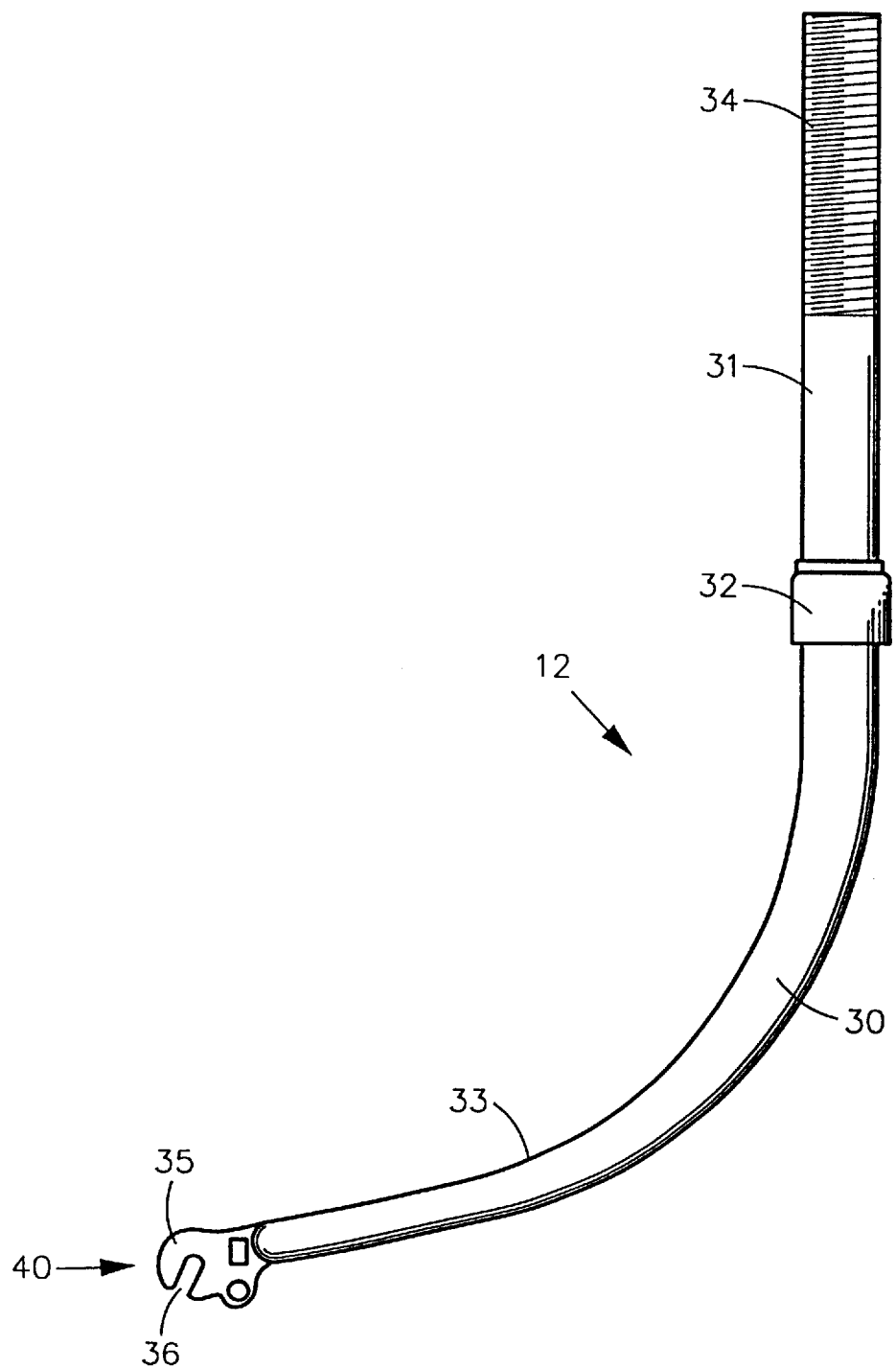
FIG. 4 is a side elevation view of the fork shown in FIG. 3.

Referring now to FIG. 4 of the drawings, there is shown a side elevation view of the fork 12 of FIG. 3. Size of the fork 12 is measured from the crown 32 to the slot 36 of the axle unit. The present invention employs a long fork (27 inch or 700 C in metric) in combination with 20 inch wheels 26, 27. After bending, the long fork 12 is the equivalent of a 20 inch fork. The placement of the bend or curved portion 30 is important. The bending is done in the lower limb of the furcation 33 where there already exists a bend, and where the wall thickness is suitable.

The fork 12 is made stronger than stock bicycle forks. In accordance with the present invention, the fork 12 may be made of chrome molybdenum steel, known as chrome moly. However, if it is desired to hold costs down, the fork 12 may be made of a heavier gauge of high tensile strength steel instead. Doubling the wall thickness of the tubing of which the fork 12 is made doubles the strength of the fork 12. A fork 12 made of chrome moly steel should have a wall thickness of approximately 1.2 mm, while a fork 12 made of high tensile strength steel should have a wall thickness of 2.4 mm. Only high tensile strength steel that passes Federal Guidelines is used. Because the fork 12 of the present invention is made stronger than stock bicycle forks, there is no need for reinforcement struts to support the forward curvature.

It is contemplated that the bending will be done with professional assembly line tooling in a factory. Since the fork 12 is already chrome plated, steps will need to be taken to protect the plating during the bending operation. The bending process or method involves the following steps: first, the steer tube 31 is held rigid. Then, pressure is applied to the furcations 33 to bend them around a mandrel having a bending radius of about six inches. The pressure is continued until the furcations 33 come in contact with a preset stop. Due to the elasticity of the metal, the fork 12 springs back after bending. Thus, the fork 12 needs to be overbent slightly to compensate for the springback. The amount of overbend needed to compensate for the springback is easily determined empirically.

It has been found that if a specimen fork 12 needs to be bent by hand, this may be done by using a standard conduit bender of the right size, and modifying it slightly to accept the fork 12.

The fork 12 is bent in the lower limb above the dropout. The fork 12 is bent in a smooth curve having about a six inch bending radius that stops short of being a ninety degree bend. The bend is on the order of 75 degrees, and may fall in the range of about 70 degrees to about 80 degrees. This bend results in a quality fork 12 that gives the illusion of a longer and lower, low-rider look. The bend does not, however, damage the structural integrity of the fork 12, or damage the chrome plating, or damage the steerability of the bicycle 10 after the fork 12 is installed.

The steer tube 31 mounts to the frame 11 of the bicycle 10 by means of the threads 34. The hub or axle of the front wheel 26 mounts to the openings or slots 36 in the flattened fastening members or ears 35 at the distal end of the fork 12. The bent long fork 12 becomes the equivalent of a twenty inch fork and is used with twenty inch wheels 26, 27. The frame 11 and pedals 17, 18 of the bicycle 10 have the same ground clearance as before. It will then be found that the bicycle 10 has been converted to a low rider, in that the front wheel 26 now extends forward in front of the bicycle 10, and the bicycle 10 will give the illusion of being longer and lower.

Figure 5:
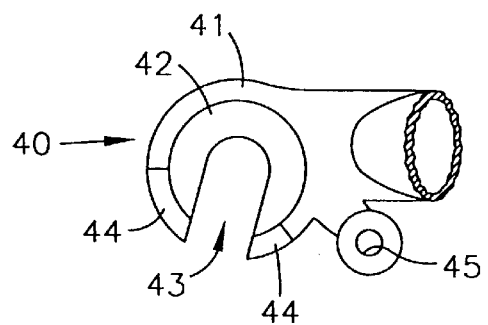
FIG. 5 is a side elevation view of a safety dropout for a low rider fork made in accordance with the principles of the present invention.

The fork 12 is provided with a safety feature known as a safety dropout 40. The dropout 40 is disposed at the distal end of the furcations 33, and may be either of tab tip design, or may be of the design known as the reversed dropout 40. Referring now to FIG. 5, there is shown a safety dropout 40. In accordance with the present invention, a redundant safety feature is built into the dropout 40. The typical stock dropout includes a washer that is usually thrown away by the bicycle owner. In the dropout 40 of the present invention, the washer is built into the fork so that it cannot be thrown away. In FIG. 5, the dropout 40 comprises a member 41 having a flat surface, on top of which is a raised generally circular washer portion 42 made integral therewith. A slot 43 to receive the axle (not shown) of the bicycle wheel passes through both the member 41 and the washer portion 42. The dropout 40 is provided with raised lips 44 to retain the nut (not shown). The dropout 40 also includes a threaded eyelet 45.

Figure 6:
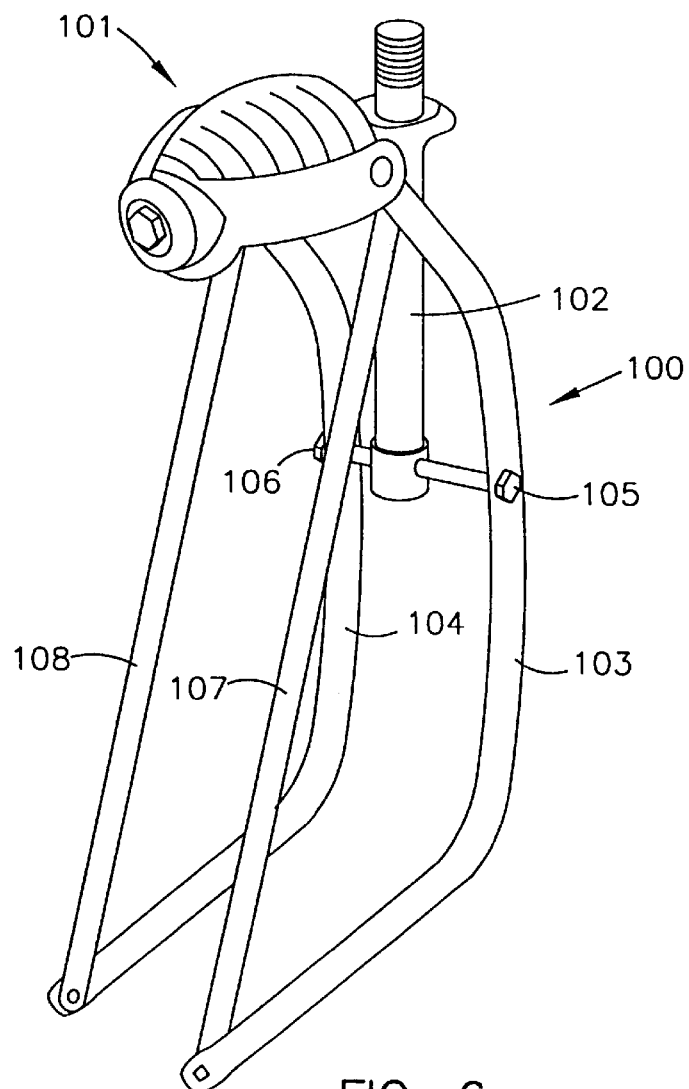
FIG. 6 is a perspective view of a low rider springer fork constructed in accordance with the principles of the present invention.

Referring now to FIG. 6, there is shown a perspective view of a low rider springer fork 100 constructed in accordance with the principles of the present invention. The fork 100 comprises a spring assembly 101, a steer tube 102, a left furcation 103, and a right furcation 104. The furcations 103, 104 are attached to the steer tube 102 by a screw 105 and a nut 106. A left strut 107 and a right strut 108 extend from the spring assembly 101 to the distal end of the furcations 103, 104.

Figure 7:
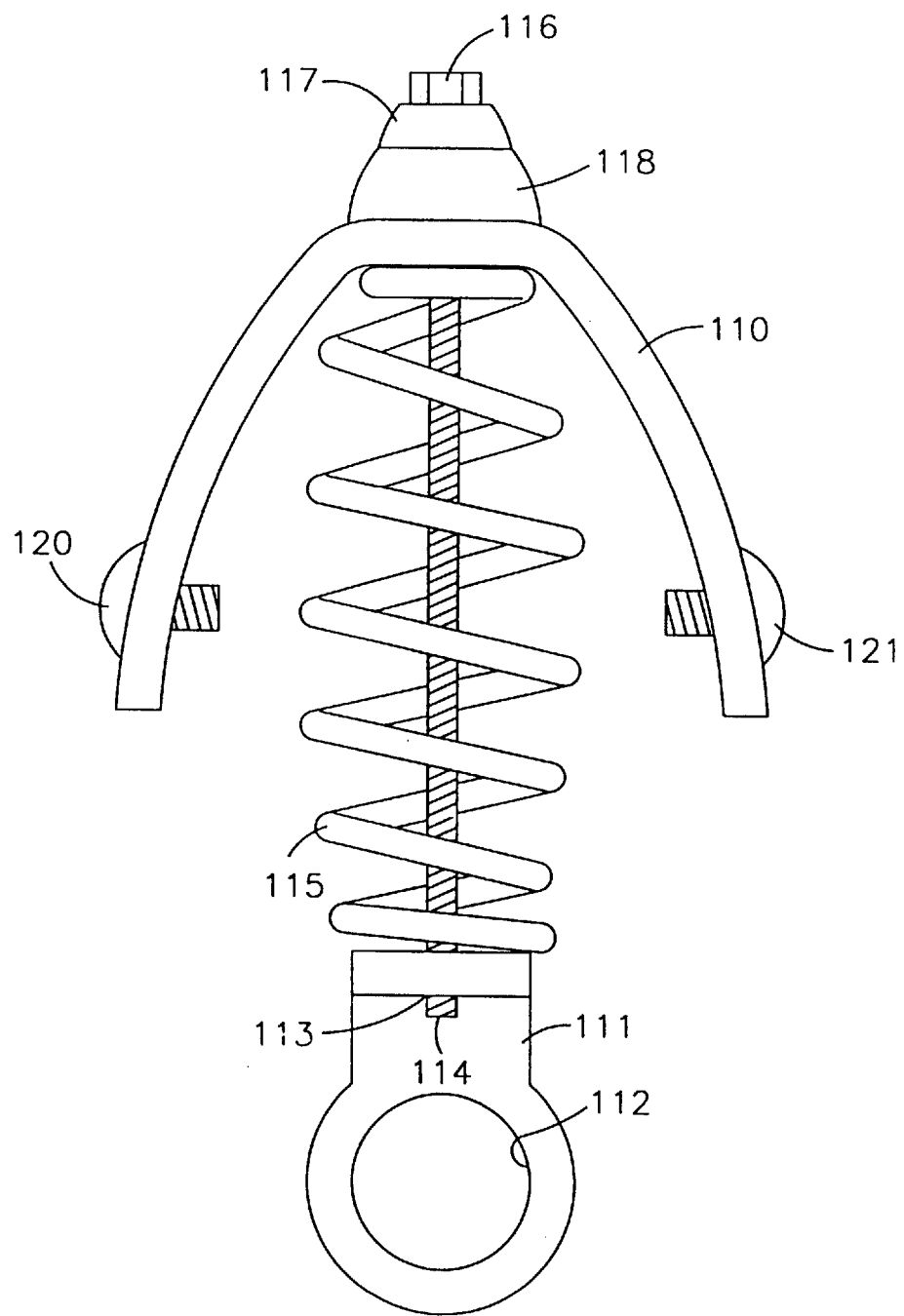
FIG. 7 is a plan view of the spring assembly of the springer fork shown in FIG. 6.

Referring now to FIG. 7, there is shown a plan view of the spring assembly 101. The spring assembly 101 comprises a yoke 110 and an L-shaped member 111 having an opening 112 for the steer tube 102 (FIG. 6). The L-shaped member 111 also has a threaded hole 113 for receiving a screw 114. A helical spring 115 is captured between the yoke 110 and the L-shaped member 11. The head 116 of the screw 114 engages a metal washer 117 that compresses a flexible annular member 118 against the yoke 110. Screws 120, 121 are provided at the distal ends of the yoke 110 for mounting the furcations 103, 104 and the struts 107, 108 (FIG. 6).

Figure 8:
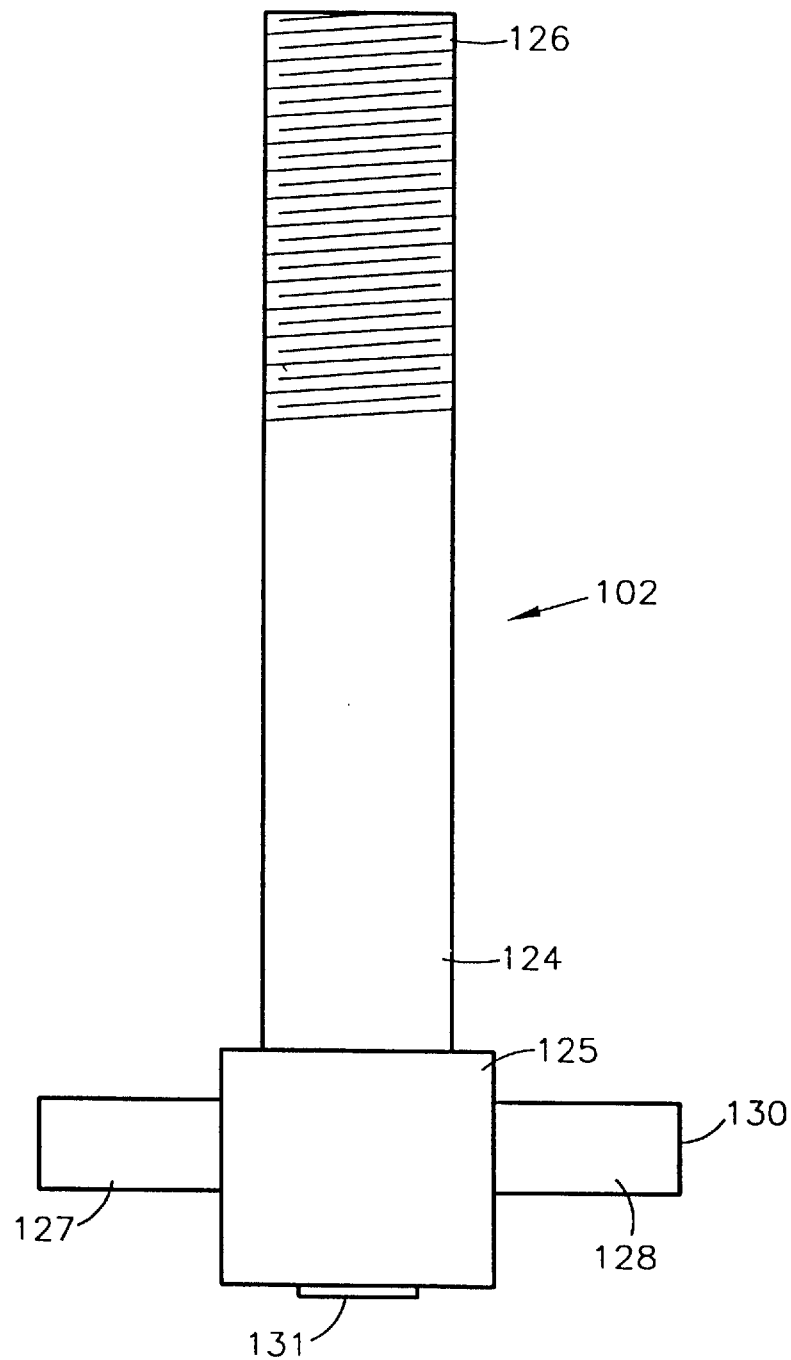
FIG. 8 is an elevation view of the steer tube of the springer fork shown in FIG. 6.

Referring now to FIG. 8, there is shown an elevation view of the steer tube 102. The steer tube 102 comprises a threaded tube 124 having one end fastened to a larger diameter tube 125, as by welding, and having threads 126 at the other end. The threaded tube 124 is provided for mounting the springer fork 100 to the bicycle frame (not shown).

The larger diameter tube 125 is provided for mounting the springer fork 100 to the furcations 103, 104 (FIG. 6). Two short sections of hollow tubing 127, 128 are fastened at right angles to the larger diameter tube 125, as by welding. An opening 130 extends all the way through the two short sections of hollow tubing 127, 128 and through the larger diameter tube 125. This opening 130 accommodates the screw 105 shown in FIG. 6 that mounts the furcations 103, 104 to the springer fork 100 by means of a nut 106.

The steer tube 102 is provided with a threaded opening 131 located at the bottom thereof for supporting a front fender (not shown). The threaded opening 131 may be provided by welding a threaded member such as a nut to the bottom of the larger diameter tube 125. The entire steer tube 102 is chrome plated.

Figure 9:
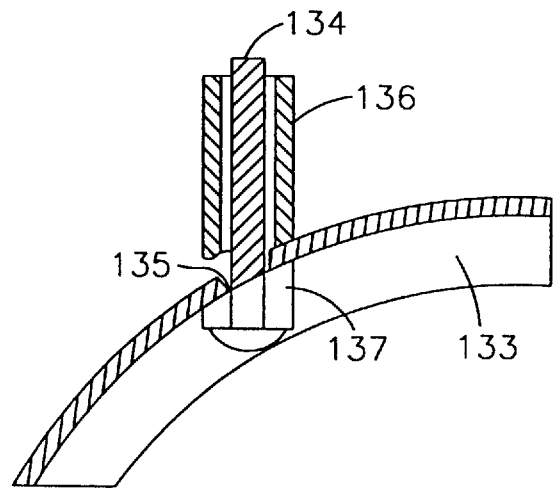
FIG. 9 is an elevation view, partly in cross section, of a fender mounting arrangement for use with the springer fork of FIG. 6.

Referring now to FIG. 9, there is shown a fender 133, partly in cross section. It will be understood that the fender 133 is provided with radial struts (not shown) that connect to the axle of the bicycle. A long screw 134 passes through an opening 135 in the fender 133. The end of the screw 134 engages the threaded opening 131 seen in FIG. 8 that is provided in the bottom of the steer tube 102. For cosmetic purposes, a long, tubular plated sleeve 136 is slipped over the screw 134 before it is fastened to the steer tube 102. The sleeve 136 is shown in cross section in FIG. 9. The sleeve 136 may be on the order of two inches long and 7/16 inch in diameter, and may be cut from existing tubing, if desired. An angulated washer 137 is provided between the head of the screw 134 and the inner surface of the fender 133.

Figure 10:
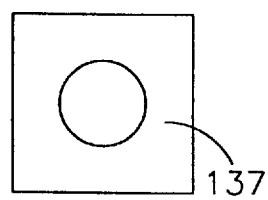
FIG. 10 is an enlarged top view of the angulated washer used in the fender mounting arrangement shown in FIG. 9.
Figure 11:
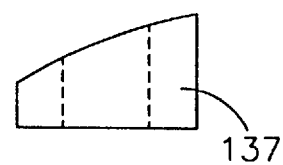
FIG. 11 is an enlarged side view of the angulated washer shown in FIGS. 9 and 10.

Referring now to FIGS. 10 and 11, top and side views of an exemplary angulated washer 137 are shown. The angulated washer 137 may slope at an angle of approximately 45 degrees on the upper side that contacts the inner surface of the fender 133. There may be approximately ¼ inch difference in elevation from the low side to the high side of the angulated washer 137. The low side of the angulated washer 137 may be on the order of 1/16 to ⅛ inch high.

Thus, there has been described a novel low rider kit for a bicycle including chrome mirrors, white-wall tires, chrome pedals, a chrome chain, a chrome chainguard, chrome fenders, high-rise handlebars, a chrome "sissy-bar", chrome wheels, a banana seat, and a specially bent fork. It will be seen that the fork has many advantages over the prior art. It is safe, it is less expensive, it is already chrome plated, it gives the illusion of a longer and lower appearance to the bicycle, and it extends the front wheel out in front of the bicycle. Furthermore, the method of making the fork of the present invention has also been disclosed.

There has also been disclosed a novel springer fork for use in a low rider kit for a bicycle. In accordance with the present invention, the low rider springer fork is made by bending a 26 inch fork to make a 20 inch curved fork. The bending is done cold, that is, without heating the fork and without damaging the chrome plating. The fork is bent into a smooth curve having about a six inch bending radius. The bend is slightly less than a ninety degree bend, and is in the range of about 70 degrees to about 80 degrees.

Struts that are normally a part of the springer fork are shortened to accommodate the change from a 26 inch fork to a 20 inch curved fork. The bend gives the appearance of a low rider without bringing the pedals closer to the ground. No re-chroming is necessary, and there is no buckling of metal.

The low rider springer fork is used with a standard 20 inch wheel and a standard 20 inch fender. A threaded fastener is affixed to the bottom of the steer tube for fastening the fender. A long screw may be passed through a hole in the fender and into the threaded fastener in the bottom of the steer tube. An angulated washer may be used to accommodate the curvature of the fender to the head of the screw. A two inch section of hollow chrome tubing may be used to hide the screw threads.

The low rider kit of the present invention, including the specially bent fork, provides many features and advantages that fill a long-felt need and that distinguish it over the prior art. The placement of the bend is at the point where a bend already exists, and where the wall thickness is suitable. No heat is used in making the bend. No kinks are produced by the bending. The fork is made of higher strength material, and is made of a heavier wall thickness. The need for reinforcement struts to support the forward curvature is eliminated. The bending does not mar the chrome plating, does not damage the structural integrity, and does not adversely affect the steerability of the bicycle. A safety dropout is used that has a built in safety washer. This eliminates the need for a separate safety washer, and prevents the safety washer being thrown away. The safety dropout includes raised lips to retain the axle nut.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

What is claimed is:

1. An improvement in a bicycle fork having a steer tube, a spring assembly fixed to said steer tube, tubular furcations fixed to said spring assembly, said furcations having a wall thickness and having lower limbs, and struts extending away from said spring assembly, said improvement comprising:

said lower limbs of said furcations having a bend that extends said furcations in a forward direction and converts a long fork to a twenty inch fork.

2. A bicycle fork as in claim 1, wherein the improvement further comprises:

the placement of said bend is located in the lower half of said furcations.

3. A bicycle fork as in claim 2, wherein the improvement further comprises:

said struts being shortened to accommodate a change from a long fork to a twenty inch fork.

4. A bicycle fork as in claim 3, wherein the improvement further comprises:

a threaded fastener affixed to the bottom of said steer tube for fastening a fender.

5. A bicycle fork as in claim 4, wherein the improvement further comprises:

said fork being made of high strength material having a heavy wall thickness.

6. A bicycle fork as in claim 5, wherein the improvement further comprises:

said bend having a bending radius of substantially six inches;

said bend making an angle between said furcations and said steer tube in the range of between seventy and eighty degrees.

7. A low-rider springer fork comprising:

a steer tube having an upper portion and a lower portion;

a spring assembly including a yoke, a generally L-shaped member having an opening through which passes the upper portion of said steer tube, a helical spring captured between said yoke and said L-shaped member, a flexible annular member, an elongated fastener extending longitudinally through said yoke, said flexible annular member and said helical spring for compressing said flexible annular member against said yoke;

a first furcation fastened to a first distal end of said yoke;

a second furcation fastened to a second distal end of said yoke;

a first strut fastened to said first distal end of said yoke;

a second strut fastened to said second distal end of said yoke;

a rigid attachment member securing the lower portion of said steer tube to a mid portion of said furcations;

the lower limbs of said furcations having a bend that extends said furcations in a forward direction, said bend having a bending radius of substantially six inches, said bend making an angle between said furcations and said steer tube in the range of between seventy and eighty degrees, the distal end of said struts generally coinciding with the distal end of said furcations.

8. The low rider springer fork as in claim 7 further characterized in that:

said fork is a full size 26-inch fork prior to bending, and is the equivalent of a 20-inch fork after bending; and said front wheel is a 20-inch wheel.

9. The lower rider springer fork as in claim 8 further characterized in that:

a threaded fastener is fixed to the bottom of said steer tube for fastening a fender.

10. The low rider springer fork as in claim 9 further characterized in that:

an angulated washer is provided to match the curvature of the fender.

11. The lower rider springer fork as in claim 10 further characterized in that:

said bend having a bending radius of substantially six inches;

said bend making an angle between said furcations and said steer tube in the range of between seventy and eighty degrees.

12. The lower rider springer fork as in claim 11 further characterized in that:

said fork being made of high strength material having a heavy wall thickness.

* * * * *